United States Patent
Darr et al.

(10) Patent No.: US 8,429,898 B2
(45) Date of Patent: Apr. 30, 2013

(54) SELECTIVE CATALYTIC REDUCTION (SCR) CATALYST DEPLETION CONTROL SYSTEMS AND METHODS

(75) Inventors: Rebecca J. Darr, Milford, MI (US); James M. Perrin, Livonia, MI (US); Paul Jasinkiewicz, Northville, MI (US); Jason Daniel Mullins, Brighton, MI (US); Kyle E. Crawford, Howell, MI (US)

(73) Assignee: GM Global Technology Operations LLC

( * ) Notice: Subject to any disclaimer, the term of this patent is extended or adjusted under 35 U.S.C. 154(b) by 369 days.

(21) Appl. No.: 12/818,651

(22) Filed: Jun. 18, 2010

(65) Prior Publication Data

US 2011/0308233 A1    Dec. 22, 2011

(51) Int. Cl.
*F01N 3/20*    (2006.01)
*F01N 3/10*    (2006.01)

(52) U.S. Cl.
USPC ............... 60/285; 60/274; 60/277; 60/286; 60/295; 60/301; 60/303

(58) Field of Classification Search ............. 60/274, 60/277, 285, 286, 295, 301, 303
See application file for complete search history.

(56) References Cited

U.S. PATENT DOCUMENTS

| | | | |
|---|---|---|---|
| 6,415,602 B1 * | 7/2002 | Patchett et al. | 60/286 |
| 6,581,374 B2 * | 6/2003 | Patchett et al. | 60/286 |
| 6,662,553 B2 * | 12/2003 | Patchett et al. | 60/286 |
| 6,679,200 B2 * | 1/2004 | Dingle | 123/1 A |
| 6,698,188 B2 * | 3/2004 | Irisawa et al. | 60/285 |
| 6,742,330 B2 * | 6/2004 | Genderen | 60/286 |
| 7,063,642 B1 * | 6/2006 | Hu et al. | 477/100 |
| 7,067,319 B2 * | 6/2006 | Wills et al. | 436/37 |
| 7,150,145 B2 * | 12/2006 | Patchett et al. | 60/286 |
| 7,178,328 B2 * | 2/2007 | Solbrig | 60/286 |
| 7,213,395 B2 * | 5/2007 | Hu et al. | 60/286 |
| 7,257,941 B1 * | 8/2007 | Reuter | 60/277 |
| 7,272,924 B2 * | 9/2007 | Itoh et al. | 60/286 |
| 7,426,825 B2 * | 9/2008 | Viola et al. | 60/286 |
| 7,469,531 B2 * | 12/2008 | Viola | 60/286 |
| 7,610,750 B2 * | 11/2009 | Viola et al. | 60/286 |
| 7,628,009 B2 * | 12/2009 | Hu et al. | 60/285 |
| 7,650,746 B2 * | 1/2010 | Hu et al. | 60/286 |
| 7,707,824 B2 * | 5/2010 | Solbrig | 60/286 |
| 7,707,825 B2 * | 5/2010 | Dingle et al. | 60/286 |
| 7,799,289 B2 * | 9/2010 | Robel | 422/180 |
| 7,810,313 B2 * | 10/2010 | Stewart et al. | 60/274 |

(Continued)

OTHER PUBLICATIONS

U.S. Appl. No. 12/818,688, filed Jun. 18, 2010, Perrin et al.

*Primary Examiner* — Kenneth Bomberg
*Assistant Examiner* — Dapinder Singh

(57) ABSTRACT

A dosing control system for a vehicle includes an adaption triggering module, a dosing management module, and an adaption ending module. The adaptation triggering module triggers performance of an adaptation event when a first amount of nitrogen oxides (NOx) measured by a first NOx sensor located downstream of a selective catalytic reduction (SCR) catalyst is greater than a predicted value of the first amount of NOx. The dosing management module disables dosing agent injection during the adaptation event. The adaptation ending module selectively delays ending the adaptation event after a predetermined number of phases of the adaption event have been completed based on a comparison of the first amount of NOx with a second amount of NOx measured by a second NOx sensor located upstream of the SCR catalyst.

20 Claims, 4 Drawing Sheets

U.S. PATENT DOCUMENTS

| | | | |
|---|---|---|---|
| 7,832,200 B2 * | 11/2010 | Kesse et al. | 60/286 |
| 7,854,161 B2 * | 12/2010 | Hjorsberg et al. | 73/114.75 |
| 7,886,527 B2 * | 2/2011 | Solbrig | 60/286 |
| 8,006,483 B2 * | 8/2011 | Matsunaga et al. | 60/286 |
| 8,069,655 B2 * | 12/2011 | Carroll et al. | 60/286 |
| 8,096,110 B2 * | 1/2012 | Solbrig | 60/286 |
| 8,141,340 B2 * | 3/2012 | Garimella et al. | 60/277 |
| 8,151,556 B2 * | 4/2012 | Oriet et al. | 60/286 |
| 8,151,558 B2 * | 4/2012 | Robel et al. | 60/295 |
| 8,161,730 B2 * | 4/2012 | Chi et al. | 60/286 |
| 8,166,749 B2 * | 5/2012 | Gady | 60/277 |
| 8,166,751 B2 * | 5/2012 | Robel | 60/297 |
| 8,181,448 B2 * | 5/2012 | Kwon | 60/286 |
| 8,201,394 B2 * | 6/2012 | Chi et al. | 60/286 |
| 8,209,964 B2 * | 7/2012 | Kesse | 60/295 |
| 8,209,966 B2 * | 7/2012 | Sakata et al. | 60/295 |
| 8,225,595 B2 * | 7/2012 | Garimella et al. | 60/277 |
| 2001/0052232 A1 * | 12/2001 | Hoffmann et al. | 60/285 |
| 2002/0054844 A1 * | 5/2002 | Pfeifer et al. | 423/239.1 |
| 2002/0148220 A1 * | 10/2002 | Patchett et al. | 60/286 |
| 2002/0152745 A1 * | 10/2002 | Patchett et al. | 60/286 |
| 2002/0194841 A1 * | 12/2002 | Genderen | 60/286 |
| 2007/0033928 A1 * | 2/2007 | Hu et al. | 60/286 |
| 2007/0044457 A1 * | 3/2007 | Upadhyay et al. | 60/295 |
| 2007/0204600 A1 | 9/2007 | Kubinski et al. | |
| 2008/0022658 A1 * | 1/2008 | Viola et al. | 60/286 |
| 2008/0066455 A1 * | 3/2008 | Viola | 60/286 |
| 2008/0250774 A1 * | 10/2008 | Solbrig | 60/295 |
| 2008/0250778 A1 * | 10/2008 | Solbrig | 60/301 |
| 2009/0056315 A1 * | 3/2009 | Solbrig et al. | 60/286 |
| 2009/0133383 A1 * | 5/2009 | Shost | 60/276 |
| 2009/0293457 A1 * | 12/2009 | Grichnik et al. | 60/286 |
| 2009/0301066 A1 * | 12/2009 | Sindano et al. | 60/286 |
| 2010/0024389 A1 | 2/2010 | Gady et al. | |
| 2010/0024397 A1 * | 2/2010 | Chi et al. | 60/285 |
| 2010/0031639 A1 * | 2/2010 | Kwon | 60/286 |
| 2010/0050611 A1 * | 3/2010 | Walz et al. | 60/286 |
| 2010/0101214 A1 * | 4/2010 | Herman et al. | 60/277 |
| 2010/0101215 A1 * | 4/2010 | Wu et al. | 60/286 |
| 2010/0107609 A1 * | 5/2010 | Parmentier et al. | 60/286 |
| 2010/0122520 A1 * | 5/2010 | Han | 60/274 |
| 2010/0229530 A1 * | 9/2010 | Tanioka et al. | 60/274 |
| 2010/0326054 A1 * | 12/2010 | Kato | 60/280 |
| 2011/0072798 A1 * | 3/2011 | Herman | 60/286 |
| 2011/0162350 A1 * | 7/2011 | Ponnathpur | 60/274 |
| 2011/0167801 A1 * | 7/2011 | Massner | 60/274 |
| 2011/0185707 A1 * | 8/2011 | Upadhyay et al. | 60/274 |
| 2011/0219747 A1 * | 9/2011 | Geveci et al. | 60/274 |
| 2012/0159928 A1 * | 6/2012 | Liu et al. | 60/274 |

* cited by examiner

SELECTIVE CATALYTIC REDUCTION (SCR) CATALYST DEPLETION CONTROL SYSTEMS AND METHODS

CROSS-REFERENCE TO RELATED APPLICATIONS

This application is related to U.S. patent application Ser. No. 12/818,688 filed on Jun. 18, 2010. The disclosure of the above application is incorporated herein by reference in its entirety.

FIELD

The present disclosure relates to internal combustion engines and more particularly to exhaust treatment systems.

BACKGROUND

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

Air is drawn into an engine through an intake manifold. A throttle valve controls airflow into the engine. The air mixes with fuel from one or more fuel injectors to form an air/fuel mixture. The air/fuel mixture is combusted within one or more cylinders of the engine. Combustion of the air/fuel mixture generates torque.

Exhaust resulting from the combustion of the air/fuel mixture is expelled from the cylinders to an exhaust system. The exhaust may include particulate matter (PM) and gas. The exhaust gas includes nitrogen oxides (NOx), such as nitrogen oxide (NO) and nitrogen dioxide ($NO_2$). A treatment system reduces NOx and PM in the exhaust.

The exhaust flows from the engine to an oxidation catalyst (OC). The OC removes hydrocarbons and/or carbon oxides from the exhaust. The exhaust flows from the OC to a selective catalytic reduction (SCR) catalyst. A dosing agent injector injects a dosing agent into the exhaust stream, upstream of the SCR catalyst. Ammonia ($NH_3$) provided by the dosing agent is absorbed by the SCR catalyst. Ammonia reacts with NOx in the exhaust passing the SCR catalyst.

A dosing module controls the mass flow rate of dosing agent injected by the dosing agent injector. In this manner, the dosing module controls the supply of ammonia to the SCR catalyst and the amount of ammonia stored by the SCR catalyst. The amount of ammonia stored by the SCR catalyst is referred to as current storage (e.g., grams). The percentage of NOx input to the SCR catalyst that is removed from the exhaust is referred to as the NOx conversion efficiency. The NOx conversion efficiency is related to the current storage of the SCR catalyst. For example, the NOx conversion efficiency increases as the current storage of the SCR catalyst increases and vice versa. The dosing module may control the injection of dosing agent, for example, to maximize the NOx conversion efficiency.

SUMMARY

A dosing control system for a vehicle includes: a current storage module, an adaption triggering module, a condition assessment module, and an adaption ending module. The current storage module estimates an amount of ammonia stored by a selective catalytic reduction (SCR) catalyst. The adaptation triggering module triggers a reduction of the amount of ammonia stored by the SCR catalyst to zero at a time when a first amount of nitrogen oxides (NOx) measured by a first NOx sensor located downstream of the SCR catalyst is greater than a predicted value of the first amount of NOx. After an estimated time when the ammonia stored by the SCR catalyst should be equal to zero, the condition assessment module determines whether the estimate at the time when the adaptation triggering module triggered the reduction was one of greater than or less than an actual amount of ammonia that was stored by the SCR catalyst at the time. The adaptation ending module selectively delays increasing the amount of ammonia stored by the SCR catalyst after the determination based on a comparison of the first amount of NOx with a second amount of NOx measured by a second NOx sensor located upstream of the SCR catalyst.

A dosing control system for a vehicle includes an adaption triggering module, a dosing management module, and an adaption ending module. The adaptation triggering module triggers performance of an adaptation event when a first amount of nitrogen oxides (NOx) measured by a first NOx sensor located downstream of a selective catalytic reduction (SCR) catalyst is greater than a predicted value of the first amount of NOx. The dosing management module disables dosing agent injection during the adaptation event. The adaptation ending module selectively delays ending the adaptation event after a predetermined number of phases of the adaption event have been completed based on a comparison of the first amount of NOx with a second amount of NOx measured by a second NOx sensor located upstream of the SCR catalyst.

A dosing control method for a vehicle includes: estimating an amount of ammonia stored by a selective catalytic reduction (SCR) catalyst; triggering a reduction of the amount of ammonia stored by the SCR catalyst to zero at a time when a first amount of nitrogen oxides (NOx) measured by a first NOx sensor located downstream of the SCR catalyst is greater than a predicted value of the first amount of NOx; after an estimated time when the ammonia stored by the SCR catalyst should be equal to zero, determining whether the estimate at the time when the reduction was triggered was one of greater than or less than an actual amount of ammonia that was stored by the SCR catalyst at the time; and selectively delaying increasing the amount of ammonia stored by the SCR catalyst after the determination based on a comparison of the first amount of NOx with a second amount of NOx measured by a second NOx sensor located upstream of the SCR catalyst.

Further areas of applicability of the present disclosure will become apparent from the detailed description provided hereinafter. It should be understood that the detailed description and specific examples are intended for purposes of illustration only and are not intended to limit the scope of the disclosure.

BRIEF DESCRIPTION OF THE DRAWINGS

The present disclosure will become more fully understood from the detailed description and the accompanying drawings, wherein.

DETAILED DESCRIPTION

Figure 1:
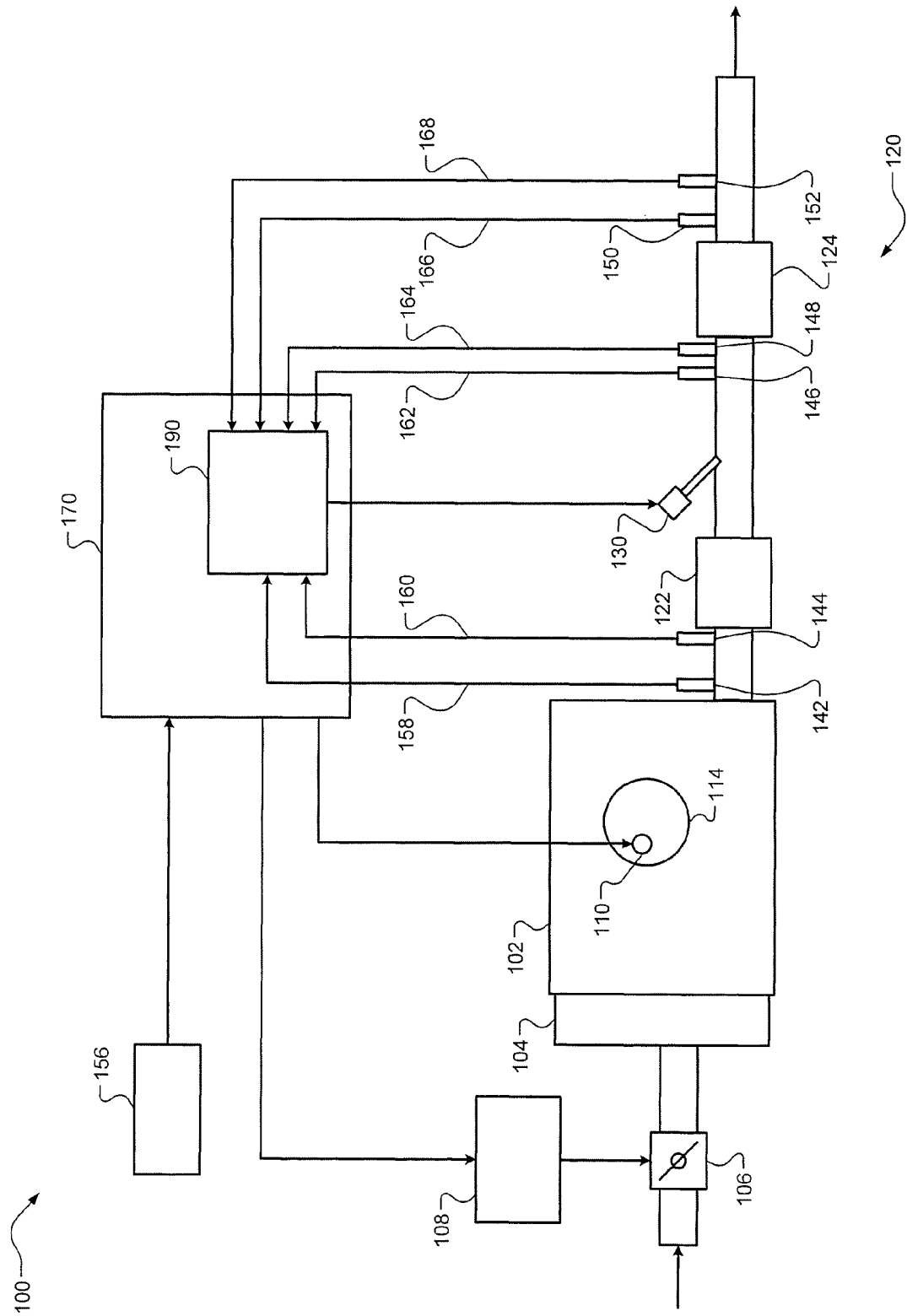
FIG. 1 is a functional block diagram of an exemplary engine system according to the principles of the present disclosure.

The following description is merely exemplary in nature and is in no way intended to limit the disclosure, its application, or uses. For purposes of clarity, the same reference numbers will be used in the drawings to identify similar elements. As used herein, the phrase at least one of A, B, and C should be construed to mean a logical (A or B or C), using a non-exclusive logical or. It should be understood that steps within a method may be executed in different order without altering the principles of the present disclosure.

As used herein, the term module may refer to, be part of, or include an Application Specific Integrated Circuit (ASIC); an electronic circuit; a combinational logic circuit; a field programmable gate array (FPGA); a processor (shared, dedicated, or group) that executes code; other suitable components that provide the described functionality; or a combination of some or all of the above, such as in a system-on-chip. The term module may include memory (shared, dedicated, or group) that stores code executed by the processor.

The term code, as used above, may include software, firmware, and/or microcode, and may refer to programs, routines, functions, classes, and/or objects. The term shared, as used above, means that some or all code from multiple modules may be executed using a single (shared) processor. In addition, some or all code from multiple modules may be stored by a single (shared) memory. The term group, as used above, means that some or all code from a single module may be executed using a group of processors. In addition, some or all code from a single module may be stored using a group of memories.

The apparatuses and methods described herein may be implemented by one or more computer programs executed by one or more processors. The computer programs include processor-executable instructions that are stored on a non-transitory tangible computer readable medium. The computer programs may also include stored data. Non-limiting examples of the non-transitory tangible computer readable medium are nonvolatile memory, magnetic storage, and optical storage.

A dosing control module controls injection of a dosing agent (e.g., urea) into an exhaust system upstream of a selective catalytic reduction (SCR) catalyst. The SCR catalyst receives exhaust output by an engine of a vehicle. The exhaust includes nitrogen oxides (NOx). Ammonia ($NH_3$) provided to the SCR catalyst via the dosing agent reacts with NOx, thereby reducing the amount of NOx that is output from the SCR catalyst.

The dosing control module estimates an amount of ammonia stored by the SCR catalyst (current storage) and controls dosing agent injection based on the current storage. The dosing control module predicts an amount of NOx that will be measured by a NOx sensor located downstream of the SCR catalyst (i.e., a downstream NOx sensor) based on the current storage. The dosing control module initiates an adaptation event when the NOx measured by the downstream NOx sensor is greater than the predicted NOx. When the measured NOx is different than the predicted NOx, the estimate of the current storage may have been greater than or less than an actual current storage of the SCR catalyst.

The dosing control module depletes the SCR catalyst of ammonia and determines whether the estimate of the current storage was greater than or less than the actual current storage during the adaptation event. After determining whether the estimate was greater than or less than the actual current storage, the dosing control module selectively delays ending the adaptation event. The dosing control module selectively delays ending the adaptation event based on a comparison of the NOx measured by the downstream NOx sensor with NOx measured by a second NOx sensor located upstream of the SCR catalyst (i.e., an upstream NOx sensor) or with a modeled value of the NOx upstream of the SCR catalyst. More specifically, the dosing control module delays ending the adaptation event until the NOx measured by the upstream NOx sensor converges with the NOx measured by the downstream NOx sensor.

The dosing control module resets the current storage equal to zero at the end of the adaptation event. Delaying the ending of the adaptation event until the NOx measurements converge allows the estimate of the current storage to be reset to zero because the actual current storage is equal to zero when the NOx measurements converge after the SCR catalyst is depleted of ammonia. In this manner, the current storage is accurate (i.e., equal to the actual current storage) when the dosing control module resumes dosing agent injection after the adaptation event ends. The accuracy of the current storage may increase the accuracy of the predicted NOx after the adaptation event ends and may allow the dosing control module to control dosing agent injection for as long as possible before performance of another adaptation event is triggered.

Referring now to FIG. 1, a functional block diagram of an exemplary engine system 100 is presented. An engine 102 generates drive torque for a vehicle. While the engine 102 is shown and will be discussed as a diesel type engine, the engine 102 may be another suitable type of engine, such as a spark-combustion engine or another type of compression combustion engine. One or more electric motors (or motor-generators) may additionally generate drive torque.

Air is drawn into the engine 102 through an intake manifold 104. Airflow into the engine 102 may be varied using a throttle valve 106. A throttle actuator module 108 controls opening of the throttle valve 106. One or more fuel injectors, such as fuel injector 110, mix fuel with the air to form an air/fuel mixture. The air/fuel mixture is combusted within cylinders of the engine 102, such as cylinder 114. Although the engine 102 is depicted as including one cylinder, the engine 102 may include more than one cylinder.

Exhaust is expelled from the engine 102 to an exhaust system 120. The exhaust may include particulate matter (PM) and exhaust gas. The exhaust (gas) includes nitrogen oxides (NOx), such as nitrogen oxide (NO) and nitrogen dioxide ($NO_2$). The exhaust system 120 includes a treatment system that reduces the respective amounts of NOx and PM in the exhaust.

The exhaust system 120 includes an oxidation catalyst (OC) 122 and a selective catalytic reduction (SCR) catalyst 124. The exhaust system 120 may also include a particulate filter (not shown). The exhaust flows from the engine 102 to the OC 122. For example only, the OC 122 may include a diesel oxidation catalyst (DOC). The exhaust flows from the OC 122 to the SCR catalyst 124. The exhaust may flow from the SCR catalyst 124 to the particulate filter. In various implementations, the particulate filter may be implemented in a common housing with the SCR catalyst 124. For example only, the particulate filter may include a diesel particulate filter (DPF).

A dosing agent injector 130 injects a dosing agent into the exhaust system 120 upstream of the SCR catalyst 124. For example only, the dosing agent injector 130 may inject the dosing agent at a location between the OC 122 and the SCR catalyst 124. The dosing agent may include urea ($CO(NH_2)_2$), ammonia ($NH_3$), and/or another suitable type of dosing agent. The dosing agent may also be referred to as an emissions fluid (EF) or a diesel emissions fluid (DEF). In implementations where the dosing agent includes urea, the urea reacts with the exhaust to produce ammonia, and ammonia is supplied to the SCR catalyst 124. The dosing agent may be diluted with water ($H_2O$) in various implementations. In implementations where the dosing agent is diluted with water, heat (e.g., from the exhaust) evaporates the water, and ammonia is supplied to the SCR catalyst 124. An exemplary chemical equation that is illustrative of the production of ammonia from an exemplary dosing agent solution is provided below.

$$HCNO + H_2O \rightarrow NH_3 + CO_2$$

The SCR catalyst 124 stores (i.e., absorbs) ammonia supplied by the dosing agent. For example only, the SCR catalyst 124 may include a vanadium catalyst, a zeolite catalyst, and/or another suitable type of SCR catalyst. An exemplary chemical equation that is illustrative of ammonia absorption is provided below.

$$NH_3 + S \rightarrow NH_3(S)$$

The SCR catalyst 124 catalyzes a reaction between stored ammonia and NOx passing the SCR catalyst 124. The amount of ammonia stored by the SCR catalyst 124 is referred to as current storage. The current storage may be expressed as a mass of ammonia (e.g., grams), a number of moles of ammonia, or another suitable measure of the amount of ammonia stored by the SCR catalyst 124.

NOx and ammonia react at a known rate, which may be referred to as a reaction rate. The reaction rate may be described by the equation:

$$RR = \frac{X \text{ Moles NH}_3}{1 \text{ Mole NO}x},$$

where RR is the reaction rate and X varies depending on the amount of nitrogen dioxide ($NO_2$) in the exhaust. For example only, X may vary between from 1.0 and 1.333.

A percentage of NOx input to the SCR catalyst 124 that is removed from the exhaust via reaction with ammonia may be referred to as NOx conversion efficiency. The NOx conversion efficiency is directly related to the current storage of the SCR catalyst 124. For example only, the NOx conversion efficiency increases as the current storage of the SCR catalyst 124 increases.

The current storage of the SCR catalyst 124, however, is limited to a maximum amount of ammonia. This maximum amount of ammonia is referred to as the maximum storage capacity of the SCR catalyst 124. Maintaining the current storage of the SCR catalyst 124 near the maximum storage capacity ensures that a maximum amount of NOx is removed from the exhaust. In other words, maintaining the current storage near the maximum storage capacity may ensure that a greatest possible NOx conversion efficiency is achieved.

However, maintaining the current storage at or near the maximum storage capacity also increases the possibility that ammonia will be exhausted from the exhaust system 120. Exhausting ammonia from the exhaust system 120 may be referred to as ammonia slip. The increased possibility of ammonia slip may be attributable to the inverse relationship between the maximum storage capacity and the temperature of the SCR catalyst 124. More specifically, the maximum storage capacity decreases as the SCR temperature increases, and the decrease in the maximum storage capacity may cause ammonia to desorb (i.e., release) from the SCR catalyst 124. In other words, an increase in the SCR temperature causes a decrease in maximum storage capacity, and ammonia stored in excess of this decreased maximum storage capacity may desorb from the SCR catalyst 124. Thus, an increase in the SCR temperature may cause ammonia slip. An exemplary chemical equation that is illustrative of ammonia desorption is provided below.

$$NH_3(S) \rightarrow NH_3 + S$$

All or a portion of the ammonia supplied by the dosing agent may oxidize before or after being absorbed by the SCR catalyst 124. For example, ammonia may react with oxygen in the exhaust to produce nitrogen ($N_2$) and water ($H_2O$). Ammonia oxidation may be triggered by, for example, heat. Exemplary chemical equations that are illustrative of ammonia oxidation are provided below.

$$4NH_3 + 3O_2 \rightarrow 2N_2 + 6H_2O$$

$$2NH_3 + 2O_2 \rightarrow N_2O + 3H_2O$$

$$4NH_3 + 5O_2 \rightarrow 4NO + 6H_2O$$

The reaction of ammonia with NOx produces nitrogen and water. Other components of the exhaust, such as oxygen ($O_2$), may also be involved in the ammonia and NOx reaction. The exemplary chemical equations provided below are illustrative of the reaction of ammonia and NOx.

$$4NH_3 + 4NO + O_2 \rightarrow 4N_2 + 6H_2O$$

$$4NH_3 + 2NO + 2NO_2 \rightarrow 4N_2 + 6H_2O$$

$$8NH_3 + 6NO_2 \rightarrow 7N_2 + 12H_2O$$

An upstream NOx sensor 142 measures NOx in the exhaust at a location upstream of the OC 122. For example only, the upstream NOx sensor 142 may measure a mass flowrate of NOx (e.g., grams per second), a concentration of NOx (e.g., parts per million), or another suitable measure of the amount of NOx. The upstream NOx sensor 142 generates an input NOx signal 158 based on the NOx in the exhaust upstream of the OC 122. In various implementations, the upstream NOx sensor 142 may be omitted and the input NOx may be modeled based on one or more engine operating parameters. A first temperature sensor 144 measures temperature of the exhaust upstream of the OC 122. The first temperature sensor 144 generates a first temperature signal 160 based on the temperature of the exhaust upstream of the OC 122.

An oxygen sensor 146 measures oxygen ($O_2$) in the exhaust at a location between the OC 122 and the SCR catalyst 124. The oxygen sensor 146 generates an oxygen signal 162 based on the oxygen in the exhaust between the OC 122 and the SCR catalyst 124. A second temperature sensor 148 measures temperature of the exhaust at a location between the OC 122 and the SCR catalyst 124. The second temperature sensor 148 generates a second temperature signal 164 based on the temperature of the exhaust between the OC 122 and the SCR catalyst 124. For example only, the oxygen sensor 146 and the second temperature sensor 148 may be located between where the dosing agent injector 130 injects the dosing agent and the SCR catalyst 124.

A downstream NOx sensor 150 measures NOx in the exhaust at a location downstream of the SCR catalyst 124. For example only, the downstream NOx sensor 150 may measure a mass flowrate of NOx (e.g., grams per second), a concentration of NOx (e.g., parts per million), or another suitable measure of the amount of NOx. The downstream NOx sensor 150 generates an output NOx signal 166 based on the NOx in the exhaust downstream of the SCR catalyst 124. The downstream NOx sensor 150 is also cross-sensitive to ammonia and, therefore, the output NOx signal may also reflect ammonia in the exhaust downstream of the SCR catalyst 124. A third temperature sensor 152 measures temperature of the exhaust downstream of the SCR catalyst 124. The third temperature sensor 152 generates a third temperature signal 168 based on the temperature of the exhaust downstream of the SCR catalyst 124.

One or more other sensors 156 may be implemented in the engine system 100. For example only, the other sensors 156 may include a mass air flowrate (MAF) sensor, an exhaust flow rate (EFR) sensor, an intake air temperature (IAT) sensor, a coolant temperature sensor, a manifold absolute pressure (MAP) sensor, an engine speed (RPM) sensor, an exhaust pressure sensor, and/or other suitable sensors.

An engine control module (ECM) 170 controls the torque output of the engine 102. The ECM 170 may include a dosing control module 190 that controls the injection of the dosing agent. For example only, the dosing control module 190 may control the timing and rate of dosing agent injection. The dosing control module 190 controls the supply of ammonia to the SCR catalyst 124 and the current storage of the SCR catalyst 124 via controlling the injection of dosing agent.

The rate at which dosing agent is injected may be referred to as a dosing rate (e.g., grams per second), and the rate at which ammonia is supplied to the SCR catalyst 124 may be referred to as an ammonia supply rate (e.g., grams per second). The dosing control module 190 may determine a target supply rate for supplying ammonia to the SCR catalyst 124, determine a target dosing rate to achieve the target supply rate, and control the injection of dosing agent at the target dosing rate.

The dosing control module 190 predicts the amount of NOx that will be measured by the downstream NOx sensor 150 and compares the predicted amount of NOx with the amount of NOx measured by the downstream NOx sensor 150. The dosing control module 190 selectively initiates performance of an adaptation event based on the comparison of the predicted amount of NOx with the amount of NOx measured by the downstream NOx sensor 150. For example only, the dosing control module 190 may trigger the performance of an adaptation event when the NOx measured by the downstream NOx sensor 150 is greater than the predicted amount of NOx. When the measured NOx is greater than the predicted amount of NOx, the current storage estimated by the dosing control module 190 may have been greater than or less than the actual amount of ammonia stored by the SCR catalyst 124.

An adaptation event involves disabling (or slowing) the injection of dosing agent to deplete the SCR catalyst 124 of ammonia. After a time when the SCR catalyst 124 should be depleted of ammonia (based on the estimate of the current storage when the adaptation event was triggered), the dosing control module 190 monitors the NOx conversion efficiency and, more specifically, whether NOx is still reacting with ammonia.

The dosing control module 190 may determine whether the actual current storage of the SCR catalyst 124 was greater than the estimated current storage (i.e., overloaded) or less than the estimated current storage (i.e., underloaded) based on whether NOx is reacting after the time when the SCR catalyst 124 should be depleted of ammonia. For example only, if NOx is reacting after the time when the SCR catalyst 124 should be depleted of ammonia, the dosing control module 190 may determine that the SCR catalyst 124 was overloaded.

The dosing control module 190 applies a dosing rate adjustment factor to the target dosing rate. In other words, the dosing control module 190 adjusts the target dosing rate based on the dosing rate adjustment factor. The dosing control module 190 may selectively increase or decrease the dosing rate adjustment factor based on a result of the adaptation event. For example only, the dosing control module 190 increases and decreases the dosing rate adjustment factor when the SCR catalyst 124 was underloaded and overloaded, respectively. In this manner, the dosing control module 190 may increase or decrease the target supply rate to prevent future underloading or overloading after the adaptation event.

Figure 2:
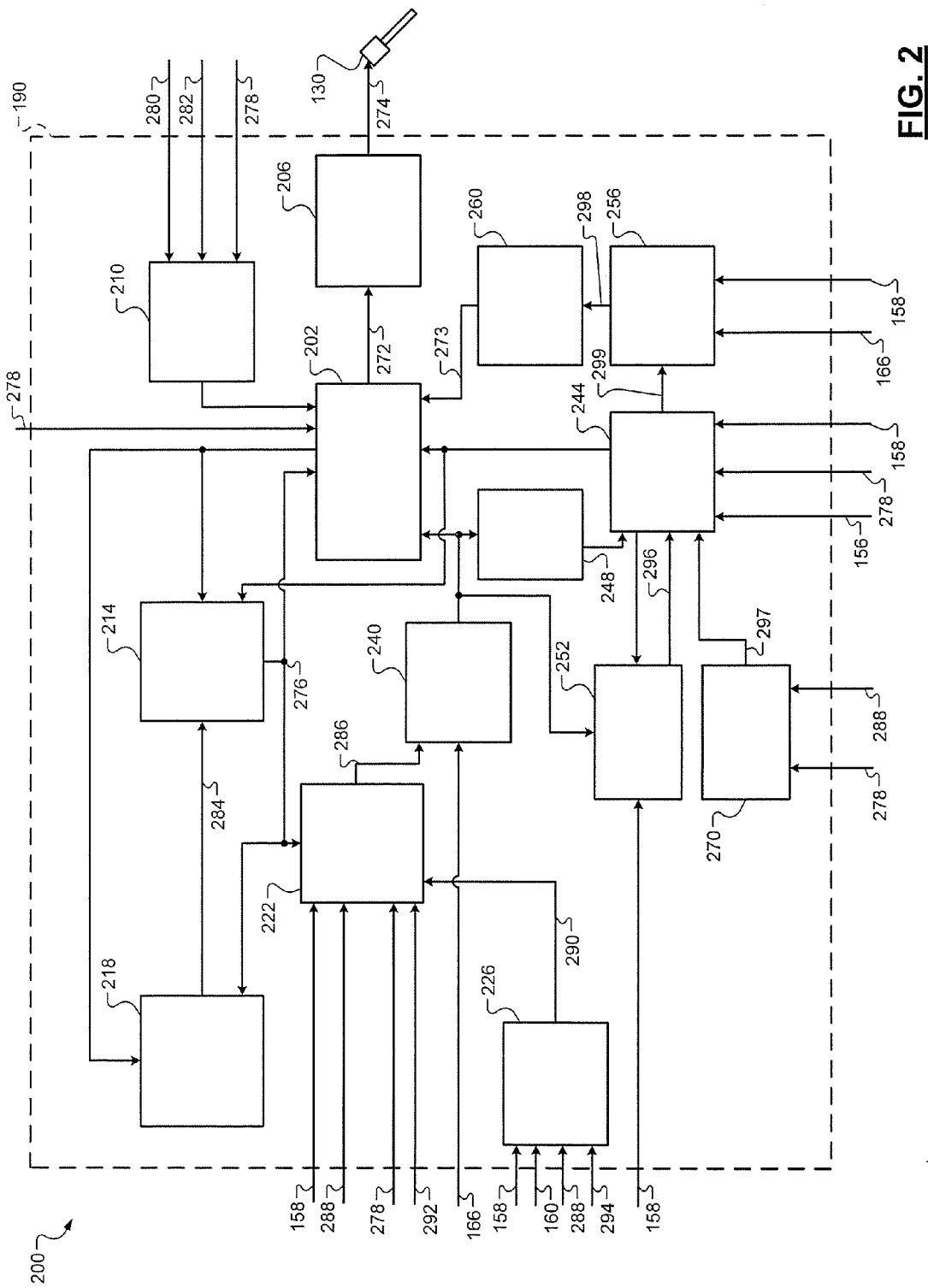
FIG. 2 is a functional block diagram of an exemplary selective catalytic reduction (SCR) catalyst control system according to the principles of the present disclosure.

Referring now to FIG. 2, a functional block diagram of an exemplary dosing control system 200 is presented. The dosing control module 190 may include a dosing management module 202, an injector control module 206, a percentage setting module 210, a current storage module 214, a conversion efficiency module 218, a predicted NOx output module 222, and a NO2 input module 226. The dosing control module 190 may also include an adaptation triggering module 240, an adaptation ending module 244, a timer module 248, an accumulation module 252, a condition assessment module 256, a factor adjustment module 260, and a difference determination module 270.

The dosing management module 202 determines a target dosing rate 272. The dosing management module 202 adjusts the target dosing rate 272 based on the dosing rate adjustment factor before providing the target dosing rate 272 to the injector control module 206. For example only, the dosing rate adjustment factor 273 may be a value between 2.0 and 0.0, inclusive. The dosing management module 202 may adjust the target dosing rate 272 by adjusting (e.g., multiplying) the target dosing rate 272 by the dosing rate adjustment factor 273 before providing the target dosing rate 272 to the injector control module 206.

The injector control module 206 applies a signal 274 to the dosing agent injector 130 to achieve the target dosing rate 272. The signal 274 applied to the dosing agent injector 130 may be, for example, a pulse width modulation (PWM) signal or another suitable type of signal. The injector control module 206 may set the duty cycle (i.e., percentage of time ON during a predetermined period of time) of the signal 274 to achieve the target dosing rate 272 and apply the PWM signal to the dosing agent injector 130.

The target dosing rate 272 corresponds to an injection rate of the dosing agent to achieve the target supply rate of ammonia to the SCR catalyst 124. The target supply rate corresponds to a desired rate to supply ammonia to the SCR catalyst 124. In implementations where ammonia is injected as the dosing agent, the target dosing rate 272 may be equal to or approximately equal to the target supply rate. The dosing management module 202 may determine the target supply rate 272 based on a target current storage for the SCR catalyst 124, the current storage 276 of the SCR catalyst 124, the input NOx 158, and/or one or more other suitable parameters. The dosing management module 202 may determine the target supply rate, for example, to maximize the NOx conversion efficiency, to minimize the output NOx 166, to minimize ammonia slip, and/or to achieve one or more other suitable goals.

The dosing management module 202 may determine the target current storage based on a percentage of the maximum storage capacity of the SCR catalyst 124. The maximum storage capacity may be determined based on the SCR temperature 278. For example only, the maximum storage capacity decreases as the SCR temperature 278 increases, and vice versa. The percentage setting module 210 may determine the percentage based on, for example, the engine speed 280, engine load 282, and the SCR temperature 278. The SCR temperature 278 may be estimated based on the first, second, and third temperatures 160, 164, and 168, respectively, in various implementations. In other implementations, the SCR temperature 278 may be measured using an SCR temperature sensor (not shown) or determined in another suitable manner. The SCR temperature 278 may be, for example, an average temperature of the SCR catalyst 124.

The current storage module 214 estimates the current storage 276 of the SCR catalyst 124. For example only, the current storage module 214 may estimate the current storage 276 of the SCR catalyst 124 based on the target supply rate, the input NOx 158, the output NOx 166, and/or one or more other suitable parameters. More specifically, the current storage module 214 may estimate the current storage 276 of the SCR catalyst 124 based on the target supply rate, the NOx conversion efficiency 284, and/or one or more other suitable parameters.

The conversion efficiency module 218 estimates the NOx conversion efficiency 284. For example only, the conversion efficiency module 218 may estimate the NOx conversion efficiency 284 based on the current storage 276 of the SCR catalyst 124, the target supply rate, the input NOx 158, one or more of the temperatures, the EFR 288, and/or one or more other suitable parameters. The EFR 288 may be measured using an EFR sensor (not shown) or determined based on, for example, the MAF.

The predicted NOx output module 222 predicts the output NOx that will be measured by the downstream NOx sensor 150. The predicted value of the output NOx may be referred to as a predicted output NOx 286. For example only, the predicted NOx output module 222 may determine the predicted output NOx 286 based on the input NOx 158, the NOx conversion efficiency 284, the EFR 288, the SCR temperature 278, an amount of nitrogen dioxide 290 input to the SCR catalyst 124, an amount of HC 292 stored by the particulate filter, and/or one or more other suitable parameters.

The NO2 input module 226 estimates the amount of nitrogen dioxide 290 input to the SCR catalyst 124. The NO2 input module 226 may estimate the amount of nitrogen dioxide 290 input to the SCR catalyst 124 based on the input NOx 158 and an estimated ratio of the input NOx 158 that is nitrogen dioxide. The estimated ratio of the input NOx 158 that is nitrogen dioxide may be estimated based on the exhaust conditions and the input NOx 158. The exhaust conditions include, for example, exhaust pressure 294, one or more of the temperatures 160, 164, and 168, the EFR 288, the equivalence ratio (EQR) of the air/fuel mixture supplied to the engine 102, and/or one or more other suitable parameters.

The adaptation triggering module 240 selectively triggers the performance of an adaptation event. The adaptation triggering module 240 selectively triggers the performance of the adaptation event based on the output NOx 166 and the predicted output NOx 286. For example only, the adaptation triggering module 240 triggers the performance of the adaptation event when the output NOx 166 is greater than the predicted output NOx 286.

Figure 3:
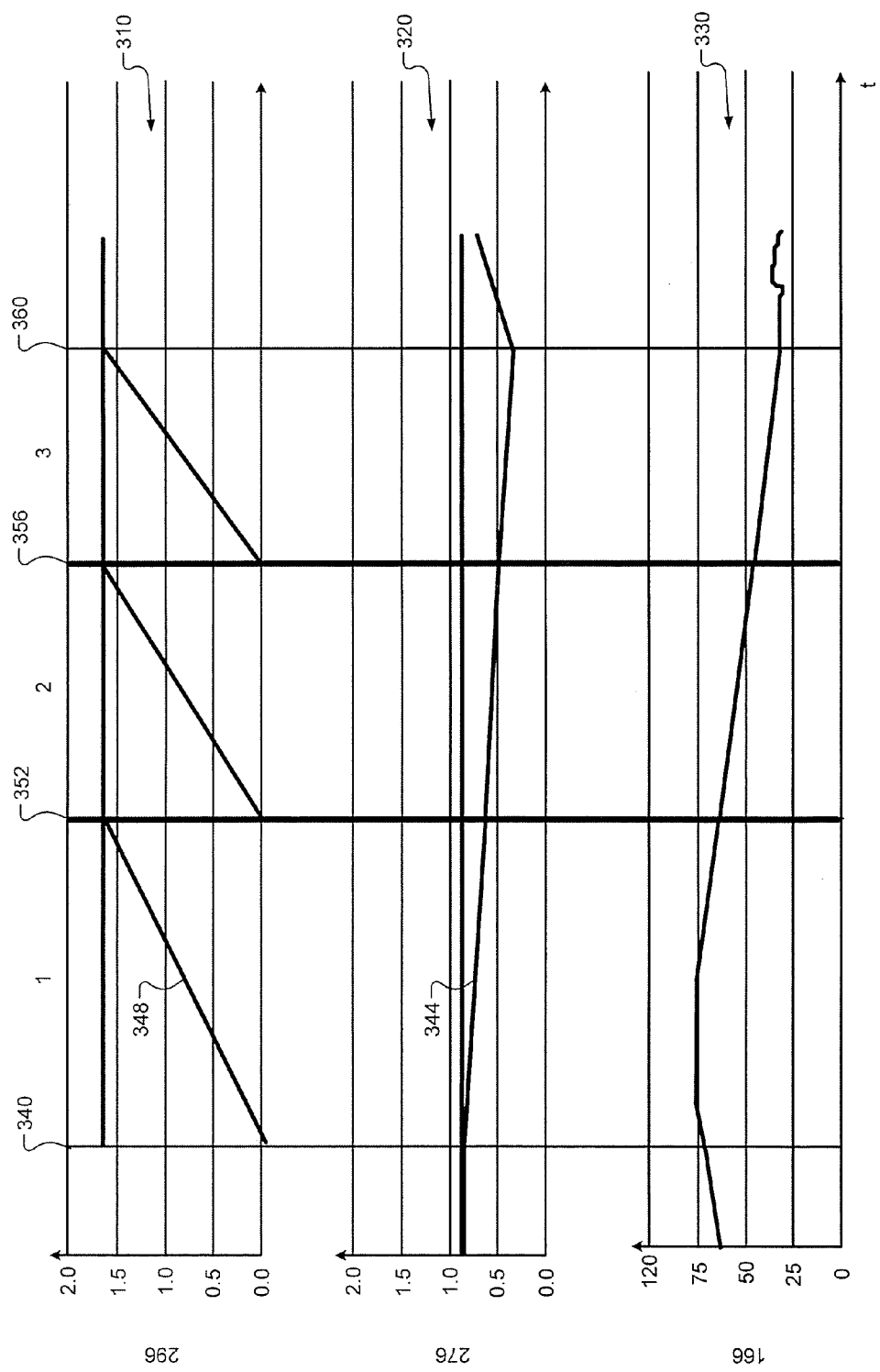
FIG. 3 includes a graph of input nitrogen oxides (NOx) as a function of time, a graph of current storage as a function of time, and a graph of output NOx as a function of time, according to the principles of the present disclosure.

Referring now to FIG. 3, and with continuing reference to FIG. 2, an exemplary graph 310 of the accumulated input NOx 296 versus time, an exemplary graph 320 of the current storage 276 versus time, and an exemplary graph 330 of the output NOx 166 versus time is presented. Performance of an adaptation event is triggered at approximately time 340 in FIG. 3.

The dosing management module 202 disables dosing agent injection when the performance of the adaptation event is triggered. The dosing management module 202 may disable dosing agent injection until the adaptation ending module 244 triggers an end of the adaptation event. Instead of disabling dosing agent injection, the dosing management module 202 may slow dosing agent injection in various implementations. Exemplary trace 344 tracks the current storage 276 of the SCR catalyst 124. The current storage 276 decreases after the adaptation event is triggered due to the disablement (or slowing) of the injection of the dosing agent.

The timer module 248 starts the timer when the adaptation triggering module 240 triggers the performance of the adaptation event. The timer module 248 may also reset the timer to a predetermined reset value, such as zero, when the adaptation triggering module 240 triggers the performance of the adaptation event. The timer tracks the period of time elapsed since the performance of the adaptation event was triggered.

The performance of the adaptation event may generally be accomplished in N sequential phases. N is an integer that is greater than or equal to 2. M is a predetermined number of the N sequential phases during which the ammonia will be depleted from the SCR catalyst 124, and M is equal to N−1. M is an integer that is greater than or equal to 1. For example only, M may be equal to 2 and N may be equal to 3. An exemplary adaptation event where N is equal to 3 and M is equal to 2 is illustrated in FIG. 3.

The triggering of the performance of the adaptation event may enable the accumulation module 252. The accumulation module 252 monitors the input NOx 158 measured by the upstream NOx sensor 142 and determines the accumulated input NOx 296 based on the input NOx 158. The accumulated input NOx 296 may refer to a total amount of NOx (e.g., grams) that has been input to the SCR catalyst 124 since the accumulated input NOx was last reset.

The accumulation module 252 may reset the accumulated input NOx 296 when the performance of the adaptation event is triggered by the adaptation triggering module 240. The accumulation module 252 may reset the accumulated input NOx 296 to a predetermined reset value, such as zero. The accumulation module 252 may also reset the accumulated input NOx 296 each time when one of the N phases of the adaptation process is completed. Exemplary trace 348 tracks the accumulated input NOx 296. As time passes, NOx is input to the SCR catalyst 124 (and is output from the engine 102) and, therefore, the accumulated input NOx 296 increases.

The adaptation ending module 244 monitors the accumulated input NOx 296. The adaptation ending module 244 may prompt the accumulation module 252 to reset the accumulated input NOx each time that one of the N phases of the adaptation event is completed. For example only, the adaptation ending module 244 prompts the accumulation module 252 to reset the accumulated input NOx 296 at exemplary times 352 and 356 of FIG. 3.

The adaptation ending module 244 may estimate a depleting amount 299 of NOx based on the current storage 276 of the SCR catalyst 124 at the time when the adaptation event is triggered. The depleting amount 299 of NOx may be an estimated amount of NOx to reduce the current storage 276 to zero and to deplete the SCR catalyst 124 of ammonia. The adaptation ending module 244 may determine a phase completion amount based on M and the depleting amount 299 of NOx. For example only, the adaptation ending module 244 may determine the phase completion amount based on the depleting amount 299 of NOx divided by M. In this manner, the ammonia should be depleted from the SCR catalyst 124 after the M-th one of the N phases of the adaptation process is completed. The adaptation ending module 244 may prompt the accumulation module 252 to reset the accumulated input NOx 296 each time when the accumulated input NOx is greater than the phase completion amount. For example only, the accumulated input NOx 296 may be greater than the phase completion amount at times 352 and 356 in FIG. 3.

When the M-th one of the N phases of the adaptation process is completed (i.e., when the SCR catalyst 124 should be depleted of ammonia), the adaptation ending module 244 triggers the condition assessment module 256. For example only, the M-th one of the N phases is completed at approximately time 356 in FIG. 3. After being triggered, the condition assessment module 256 determines a loading condition 298 of the SCR catalyst 124 at the time when the adaptation event was triggered. The loading condition 298 of the SCR catalyst 124 may be one of overloaded, underloaded, or indeterminate.

The condition assessment module 256 may determine the loading condition 298 based on whether NOx being input to the SCR catalyst 124 is reacting with ammonia during the N-th one of the phases of the adaptation event. The condition assessment module 256 may determine the loading condition based 298 on, for example, the NOx conversion efficiency 284, whether the input NOx 158 is greater than the output NOx 166, and/or one or more other suitable parameters.

For example only, the condition assessment module 256 may determine that the SCR catalyst 124 was overloaded when NOx being input to the SCR catalyst 124 is reacting with ammonia during the N-th one of the phases. In various implementations, the condition assessment module 256 may monitor the NOx conversion efficiency 284 over the period between when the N-th one of the phases began and when the accumulated input NOx 296 is greater than the phase completion amount for the N-th one of the phases. If the NOx conversion efficiency 284 is greater than a predetermined conversion efficiency (e.g., 5%) over that period, the condition assessment module 256 may determine that the SCR catalyst 124 was overloaded. For example only, the N-th one of the phases of the adaptation event may include the period between time 356 and exemplary time 360 in FIG. 3.

The condition assessment module 256 notifies the factor adjustment module 260 of the loading condition 298. The factor adjustment module 260 selectively adjusts the dosing rate adjustment factor 273 based on the loading condition 298. For example only, the factor adjustment module 260 may increase the dosing rate adjustment factor 273 by a predetermined amount or percentage when the SCR catalyst 124 was underloaded. The factor adjustment module 260 may decrease the dosing rate adjustment factor 273 by a predetermined amount or percentage when the SCR catalyst 124 was overloaded.

The factor adjustment module 260 provides the dosing rate adjustment factor 273 to the dosing management module 202. After the adaptation ending module 244 selectively triggers the end of the adaptation event, the dosing management module 202 adjusts the target dosing rate 272 based on the dosing rate adjustment factor 273.

When the accumulated input NOx 296 becomes greater than the phase completion amount for the N-th one of the phases, the adaptation ending module 244 does not immediately trigger the end the adaptation event. Instead, the adaptation ending module 244 monitors the input NOx 158 and the output NOx 166 after the accumulated input NOx 296 becomes greater than the phase completion amount for the N-th one of the phases. In other words, the adaptation ending module 244 monitors the input NOx 158 and the output NOx 166 after the N-th phase of the adaptation event is completed.

The adaptation ending module 244 selectively triggers the end of the adaptation event based on a comparison of the output NOx 166 and the input NOx 158. More specifically, the adaptation ending module 244 triggers the end of the adaptation event when a difference between the output NOx 166 and the input NOx 158 is less than a predetermined difference 297. In other words, the adaptation ending module 244 triggers the end of the adaptation event when the output NOx and the input NOx are within a predetermined range of each other. The adaptation ending module 244 may require that the difference be less than the predetermined difference 297 for a predetermined period before triggering the end of the adaptation event.

The predetermined difference (or range) 297 is variable. The difference determination module 270 may set the predetermined difference based on the SCR temperature 278 and the EFR 288. The difference determination module 270 may additionally or alternatively set the predetermined difference 297 based on the engine speed 280, the engine load 282, and/or one or more other suitable parameters.

The adaptation ending module 244 also monitors the timer after the accumulated input NOx 296 becomes greater than the phase completion amount for the N-th one of the phases. The adaptation ending module 244 triggers the end of the adaptation event when the timer is greater than a predetermined maximum period. In this manner, if the output NOx 166 and the input NOx 158 are not sufficiently within the predetermined range of each other for the predetermined maximum period, the adaptation ending module 244 still triggers the end of the adaptation event. For example only, the predetermined maximum period may be approximately 10 minutes.

The dosing management module 202 enables dosing agent injection when the end of the adaptation event is triggered. The dosing management module 202 determines the target dosing rate 272, adjusts the target dosing rate 272 based on the (adjusted) dosing rate adjustment factor 273, and provides the target dosing rate 272 to the injector control module 206. The current storage module 214 resets the current storage 276 to a predetermined reset value, such as zero, when the end of the adaptation event is triggered. Because the end of the adaptation event is only triggered once ammonia is known to have been depleted from the SCR catalyst 124, the resetting of the current storage 276 to the predetermined reset value when the end of the adaptation is triggered ensures that the current storage 276 starts from an accurate starting value.

Figure 4:
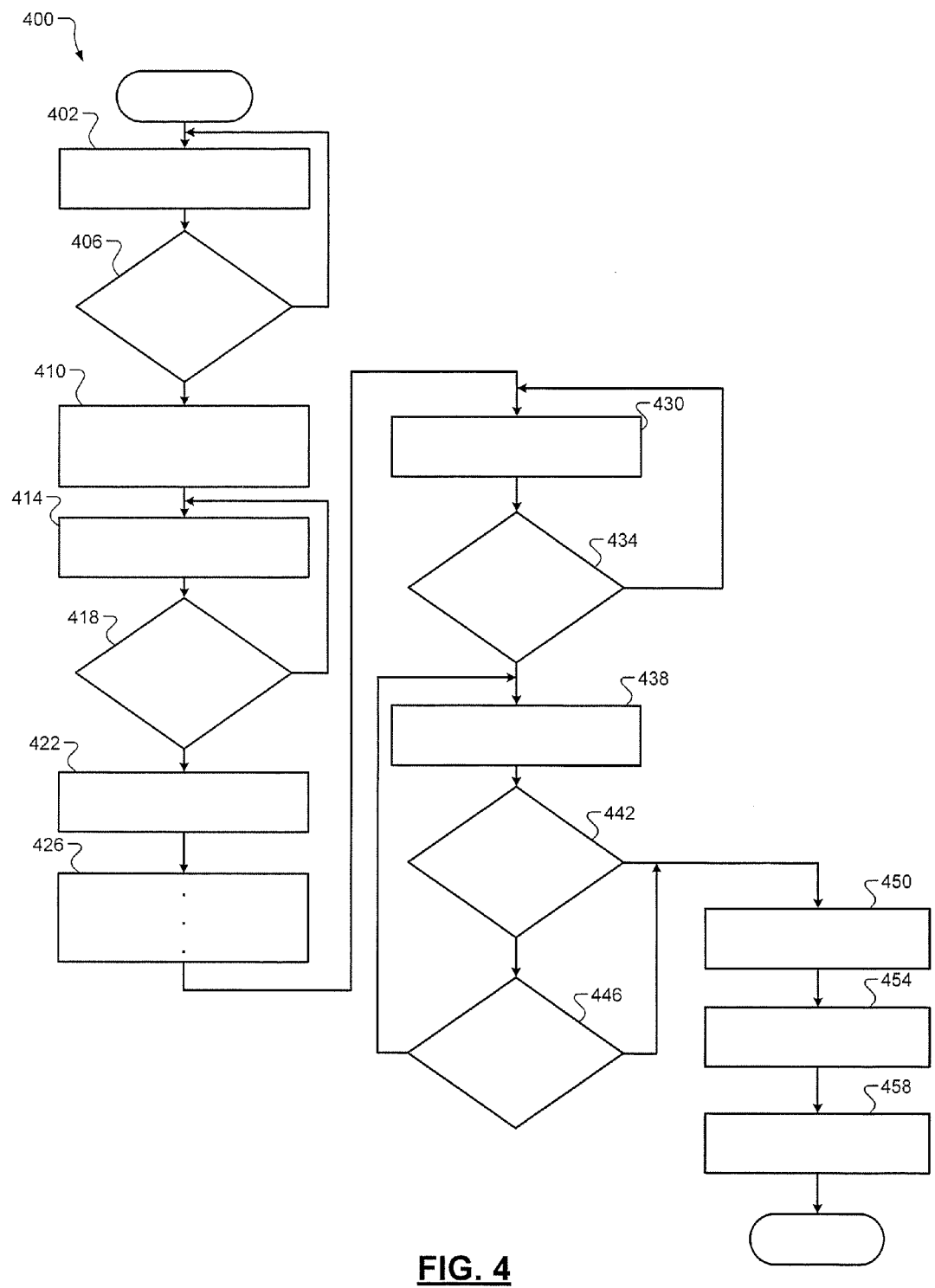
FIG. 4 is a flowchart depicting an exemplary method of performing an adaptation event according to the principles of the present disclosure.

Referring now to FIG. 4, a flowchart depicting an exemplary method 400 of performing an adaptation event is presented. Control begins at 402 where control determines the predicted output NOx 286. Control determines whether the output NOx 166 measured by the downstream NOx sensor 150 is greater than the predicted output NOx 286 at 406. If true, control may continue with 410; if false, control may return to 402.

At 410, control may trigger an adaptation event, disable dosing agent injection, and start a timer. Control determines the accumulated input NOx 296 at 414. Control determines whether the first one of the N phases of the adaptation event is complete at 418. If true, control continues at 422; if false, control returns to 414. Control may reset the accumulated input NOx 296 at 422. For example only, control may determine that the first one of the N phases is complete when the accumulated input NOx 296 is greater than the phase completion amount. In implementations where N is equal to 2, the phase completion amount may be equal to the depleting amount 299. In implementations where N is greater than or equal to 3, the phase completion amount may be equal to the depleting amount 299 divided by M, where M is equal to N−1.

While control is shown as including two or more phases (i.e., N=2 and M=1), control may include a greater number of phases (i.e., N may be greater than or equal to 2). At 426, control may perform similarly or identically to 414-422 in implementations where control performs a greater number of phases (i.e., where N is greater than or equal to 3) during an adaption event.

At 430, control determines the accumulated input NOx 296. Control determines whether the N-th one of the phases of the adaptation event is complete at 434. If true, control continues at 438; if false, control may return to 430. Control may determine the predetermined difference (or range) 297 at 438. For example only, control may determine the predetermined difference 297 based on the SCR temperature 278 and the EFR 288. Alternatively or additionally, control may determine the predetermined difference 297 based on the engine speed 280, the engine load 282, and/or one or more other suitable parameters.

Control monitors the input and output NOx 158 and 166 measured by the upstream and downstream NOx sensors 142 and 150, respectively. Control determines whether the difference between the input and output NOx 158 and 166 is less than the predetermined difference 297 at 442. If false, control may continue with 446; if true, control may transfer to 450. 450 is discussed further below.

Control may determine whether the timer is greater than the predetermined period at 446. If true, control may transfer to 450; if false, control may return to 438. For example only, the predetermined period may be approximately 10 minutes.

Referring back to 450 (i.e., when the difference is less than the predetermined difference 297 or when the timer is greater than the predetermined period), control triggers the end of the adaptation event. Control sets the current storage 276 of the SCR catalyst 124 equal to zero at 454, and control adjusts the dosing rate adjustment factor 273 at 458. Control may adjust the dosing rate adjustment factor 273 by increasing or decreasing the dosing rate adjustment factor 273 by a predetermined amount at 458 when the SCR catalyst 124 was underloaded or overloaded, respectively. Control may then end. Control re-enables dosing agent injection after the end of the adaptation event is triggered, and control adjusts the target dosing rate 272 based on the dosing rate adjustment factor 273.

The broad teachings of the disclosure can be implemented in a variety of forms. Therefore, while this disclosure includes particular examples, the true scope of the disclosure should not be so limited since other modifications will become apparent to the skilled practitioner upon a study of the drawings, the specification, and the following claims.

What is claimed is:

1. A dosing control system for a vehicle, comprising:
  a first electronic circuit configured to determine an estimated amount of ammonia stored by a selective catalytic reduction (SCR) catalyst;
  a second electronic circuit configured to determine a predicted amount of nitrogen oxides (NOx) that will be measured by a first NOx sensor located downstream of the SCR catalyst;
  a third electronic circuit configured to trigger a reduction of an actual amount of ammonia stored by the SCR catalyst to zero at a time when a first amount of NOx measured by the first NOx sensor is greater than the predicted amount;
  a fourth electronic circuit configured to, after an estimated time when the actual amount of ammonia stored by the SCR catalyst should be equal to zero, determine whether the estimated amount at the time when the third electronic circuit triggered the reduction was one of greater than or less than the actual amount of ammonia that was stored by the SCR catalyst at the time; and
  a fifth electronic circuit configured to selectively delay increasing the actual amount of ammonia stored by the SCR catalyst after the determination based on a comparison of the first amount of NOx with a second amount of NOx measured by a second NOx sensor located upstream of the SCR catalyst.

2. The dosing control system of claim 1 wherein the fifth electronic circuit is configured to selectively delay increasing the actual amount of ammonia stored by the SCR catalyst based on a difference between the first and second amounts of NOx.

3. The dosing control system of claim 1 wherein the fifth electronic circuit is configured to selectively delay increasing the actual amount of ammonia stored by the SCR catalyst until a difference between the first and second amounts of NOx is less than a predetermined difference.

4. The dosing control system of claim 3 wherein the fifth electronic circuit is configured to selectively delay increasing the actual amount of ammonia stored by the SCR catalyst until the difference is less than the predetermined difference for a predetermined period.

5. The dosing control system of claim 3 further comprising a sixth electronic circuit configured to determine the predetermined difference based on a temperature of the SCR catalyst and an exhaust flow rate.

6. The dosing control system of claim 3 further comprising a sixth electronic circuit configured to determine the predetermined difference based on an engine speed and an engine load.

7. The dosing control system of claim 1 further comprising a sixth electronic circuit configured to one of increase and decrease a dosing rate adjustment factor by a predetermined amount based on the determination.

8. The dosing control system of claim 1 further comprising:
  a sixth electronic circuit configured to increase a dosing rate adjustment factor when the estimated amount was less than the actual amount; and
  a seventh electronic circuit configured to enable injection of dosing agent after the fifth electronic circuit stops delaying, increase a target dosing rate based on the dosing rate adjustment factor, and control the injection of dosing agent to achieve the target dosing rate.

9. The dosing control system of claim 1 further comprising:
  a sixth electronic circuit configured to increase a dosing rate adjustment factor when the estimated amount was greater than the actual amount; and
  a seventh electronic circuit configured to enable injection of dosing agent after the fifth electronic circuit stops delaying, decrease a target dosing rate based on the dosing rate adjustment factor, and control the injection of dosing agent to achieve the target dosing rate.

10. The dosing control system of claim 1 wherein the first electronic circuit is configured to set the estimated amount of ammonia stored by the SCR catalyst equal to zero after the fifth electronic circuit stops delaying.

11. A dosing control method for a vehicle, comprising:
determining an estimated amount of ammonia stored by a selective catalytic reduction (SCR) catalyst;
determining a predicted amount of nitrogen oxides (NOx) that will be measured by a first NOx sensor located downstream of the SCR catalyst;
triggering a reduction of an actual amount of ammonia stored by the SCR catalyst to zero at a time when a first amount of NOx measured by the first NOx sensor is greater than the predicted amount;
after an estimated time when the actual amount of ammonia stored by the SCR catalyst should be equal to zero, determining whether the estimated amount at the time when the reduction was triggered was one of greater than or less than the actual amount of ammonia that was stored by the SCR catalyst at the time; and
selectively delaying increasing the actual amount of ammonia stored by the SCR catalyst after the determination based on a comparison of the first amount of NOx with a second amount of NOx measured by a second NOx sensor located upstream of the SCR catalyst.

12. The dosing control method of claim 11 further comprising selectively delaying increasing the actual amount of ammonia stored by the SCR catalyst based on a difference between the first and second amounts of NOx.

13. The dosing control method of claim 11 further comprising selectively delaying increasing the actual amount of ammonia stored by the SCR catalyst until a difference between the first and second amounts of NOx is less than a predetermined difference.

14. The dosing control method of claim 13 further comprising selectively delaying increasing the actual amount of ammonia stored by the SCR catalyst until the difference is less than the predetermined difference for a predetermined period.

15. The dosing control method of claim 13 further comprising determining the predetermined difference based on a temperature of the SCR catalyst and an exhaust flow rate.

16. The dosing control method of claim 13 further comprising determining the predetermined difference based on an engine speed and an engine load.

17. The dosing control method of claim 11 further comprising:
increasing a dosing rate adjustment factor when the estimated amount was less than the actual amount;
enabling injection of dosing agent after the selective delaying is stopped;
increasing a target dosing rate based on the dosing rate adjustment factor; and
controlling the injection of dosing agent to achieve the target dosing rate.

18. The dosing control method of claim 11 further comprising:
decreasing a dosing rate adjustment factor when the estimated amount was greater than the actual amount;
enabling injection of dosing agent after the selective delaying is stopped;
decreasing a target dosing rate based on the dosing rate adjustment factor; and
controlling the injection of dosing agent to achieve the target dosing rate.

19. The dosing control method of claim 11 further comprising setting the estimated amount of ammonia stored by the SCR catalyst equal to zero after the selective delaying is stopped.

20. The dosing control system of claim 1 wherein the first, second, third, fourth, and fifth electronic circuits include at least one of an Application Specific Integrated Circuit (ASIC), a processor and memory including code, a combinational logic circuit, and a field programmable gate array (FPGA).

* * * * *